US012663998B2

(12) United States Patent
Save et al.

(10) Patent No.: US 12,663,998 B2
(45) Date of Patent: Jun. 23, 2026

(54) RESET USING A SHARED RESET SIGNAL AND A RETENTION MECHANISM

(71) Applicant: Google LLC, Mountain View, CA (US)

(72) Inventors: Prathamesh Ramesh Save, San Jose, CA (US); Vinu Vijay Kumar, Belmont, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/853,966

(22) PCT Filed: Apr. 8, 2022

(86) PCT No.: PCT/US2022/024074
§ 371 (c)(1),
(2) Date: Oct. 3, 2024

(87) PCT Pub. No.: WO2023/195994
PCT Pub. Date: Oct. 12, 2023

(65) Prior Publication Data
US 2025/0224963 A1     Jul. 10, 2025

(51) Int. Cl.
*G06F 9/4401* (2018.01)
(52) U.S. Cl.
CPC .................................. *G06F 9/4401* (2013.01)
(58) Field of Classification Search
None
See application file for complete search history.

(56) References Cited

U.S. PATENT DOCUMENTS

| | | | |
|---|---|---|---|
| 11,947,887 | B1 | 4/2024 | Chakravadhanula et al. |
| 2006/0152268 | A1 | 7/2006 | Flynn et al. |
| 2008/0263396 | A1 | 10/2008 | Kimura |
| 2008/0307240 | A1* | 12/2008 | Dahan ..................... G06F 1/324 |
| | | | 713/320 |
| 2009/0106710 | A1 | 4/2009 | Teig et al. |
| 2009/0296947 | A1 | 12/2009 | Duron et al. |
| 2013/0305200 | A1 | 11/2013 | Wang et al. |

(Continued)

FOREIGN PATENT DOCUMENTS

| | | |
|---|---|---|
| TW | 202139480 A | 10/2021 |
| TW | 202203023 A | 1/2022 |

(Continued)

OTHER PUBLICATIONS

"International Search Report and Written Opinion", Application No. PCT/US2022/024074, Nov. 21, 2022, 15 pages.

(Continued)

*Primary Examiner* — Kim Huynh
(74) *Attorney, Agent, or Firm* — Colby Nipper PLLC

(57) ABSTRACT
Methods, systems, and apparatus, for reset using a shared reset signal and a retention mechanism. In some implementations, an integrated circuit includes one or more modules configured to be reset in response to a reset signal and an access control module configured to be reset in response to the reset signal. The integrated circuit includes one or more second memory elements that is configured to retain stored data during reset of the access control module. The integrated circuit includes reset control logic configured to cause the integrated circuit to be reset while the state of the access control module is preserved.

19 Claims, 7 Drawing Sheets

(56)             References Cited

U.S. PATENT DOCUMENTS

| | | |
|---|---|---|
| 2015/0048872 A1 | 2/2015 | Bartling et al. |
| 2019/0320269 A1 | 10/2019 | Haubrich et al. |
| 2020/0257627 A1* | 8/2020 | Chamarty ............. G06F 1/3275 |
| 2021/0295169 A1 | 9/2021 | Sikka et al. |
| 2023/0030985 A1* | 2/2023 | Petry .................... G06F 1/3203 |
| 2023/0205305 A1* | 6/2023 | Kowkutla ............. G06F 1/3287 |
| | | 713/323 |

FOREIGN PATENT DOCUMENTS

| | | |
|---|---|---|
| TW | 202213359 A | 4/2022 |
| WO | 2022055490 | 3/2022 |

OTHER PUBLICATIONS

"International Preliminary Report on Patentability", Application No. PCT/US2022/024074, Oct. 8, 2024, 10 pages.

Siddhapathak, et al., "Novel Test Point Algorithm for Register-Based Read Only Memory", May 13, 2025, 12 pages.

Yang, et al., "Test Point Insertion Using Functional Flip-Flops to Drive Control Points", Dec. 2009, 10 pages.

"Foreign Office Action", TW Application No. 111134665, Mar. 27, 2026, 7 pages.

* cited by examiner

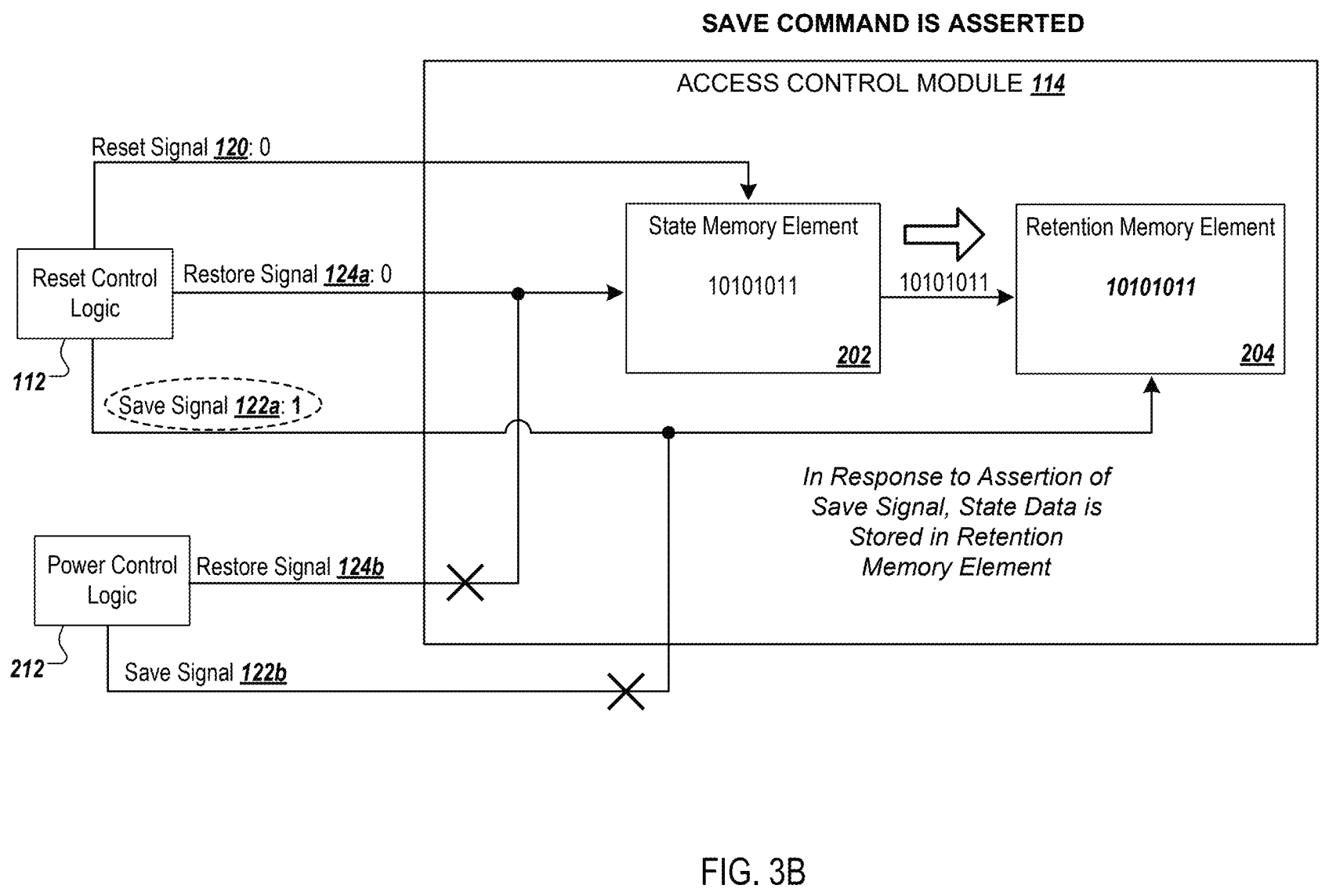

SAVE COMMAND IS ASSERTED

ACCESS CONTROL MODULE *114*

Retention Memory Element *204*

*10101011*

State Memory Element *202*

10101011

10101011

*In Response to Assertion of Save Signal, State Data is Stored in Retention Memory Element*

Reset Signal *120*: 0

Restore Signal *124a*: 0

Save Signal *122a*: 1

Reset Control Logic

*112*

Restore Signal *124b*

Power Control Logic

*212*

Save Signal *122b*

FIG. 3B

RESET USING A SHARED RESET SIGNAL AND A RETENTION MECHANISM

RELATED APPLICATION(S)

This application is a national stage entry of International Application No. PCT/US2022/024074, filed Apr. 8, 2022, the disclosure of which is incorporated herein by reference in its entirety.

TECHNICAL FIELD

This specification relates to techniques for resetting electronic components.

BACKGROUND

Electronic devices, including integrated circuits such as systems on a chip (SoCs) can contain various components that correspond to different sub-systems. For example, during operation of a SoC, sub-systems of SoC may need to be reset. However, if not managed properly, reset of the SoC's sub-systems can introduce unexpected behaviors and security vulnerabilities, especially if the SoC is only partially reset or if there are delays between reset of different sub-systems.

SUMMARY

This specification describes technologies for reset of multiple components of a device, such as a system on a chip (SoC), using a shared reset signal to reset the multiple components. The device includes a retention mechanism that is used to maintain state data of one or modules, such as security components in a security sub-system of an SoC, through the reset process. After reset, the stored state data is used to restore the state of the one or more modules, e.g., for the security components. This technique provides the ability to perform what is in effect a partial reset of a device, without the security risks that often result from other techniques. Resetting the components together avoids the risk of race conditions and other timing complexities, while the device can selectively maintain and restore the state of one or more components when it is desirable for the state to persist after the reset. In many cases it is desirable for a security module (e.g., an access control sub-system) to have its state saved and restored, but the techniques may be used to save and restore any appropriate module or subsystem (e.g., a networking module, an input/output module, a machine learning module, etc.)

As an example, a SoC is configured to control the retention mechanism to preserve state data of a security component before the reset of the security component and other components of the SoC. The state data can include information such as security settings or parameter values specifying a configuration of the security component. After the security component and other components of the SoC are reset, the state data of the security component can be restored using state data preserved by the retention mechanism to restore a prior state of the security component. For example, before the SoC asserts a reset control signal, the SoC can assert a save control signal that is provided to the retention mechanism of the security component. In response to receiving the save control signal, the retention mechanism can store the state data of the security component in a memory element that is not subject to the reset control signal. The SoC can then assert the reset control signal to concurrently clear data in the security component and other components of the SoC, including the state data of the security component. After the reset control signal is deasserted, the SoC can assert a restore signal to restore the state data of the security component preserved by the retention mechanism.

As an example, the security component can be an access control module that includes a state memory element such as a set of flip-flops and a retention memory element such as a set of latches. The state memory element stores state data of the access control module such as security settings or configuration information for the access control module. As an example, the stored data can include permission keys, encryption settings, masking registers, memory pointers or references, or the like. The state data can be stored in the state memory element as a set of values in the set of flip-flops. In response to the save signal being asserted, the retention memory element can capture the values stored in the flip-flops of the state memory elements to store the values in the latches of the retention memory element. After the save signal is asserted and the state data is stored in the retention memory element, the reset signal can be asserted. In response to the reset signal being asserted, the state memory element can be reset so that the values in the flip-flops are cleared. Data of other components of the SoC such as data of other sub-systems or modules is also cleared in response to the assertion of the reset signal. However, the state data values stored in the retention latches are not cleared during the reset. After the reset signal is asserted and the state data stored in the state memory element is cleared, a restore signal can be asserted. In response to the restore signal being asserted, the flip-flops of the state memory element can capture the values stored in the latches representing the state data. Once all of the values are captured in the flip-flops, the previous state of the access control module is restored.

In some implementations, the SoC is configured to use the retention mechanism of the security component is used for preserving state data through a reset procedure and also when power is reduced or removed from the security component. To support this, the state retention components can be placed in a different power domain from the rest of the security component, so that the retention components are still powered when power is removed from the security component. For example, the SoC can include a logic element (e.g., a controller, a state machine portion of the SoC, etc.) that controls reset of various components of the SoC including reset of the access control module. The logic element can facilitate the saving of state data in a retention memory element before reset, the clearing of state data stored in the state memory element and data of other components of the SoC during reset, and the restoring of saved state data from the retention memory element back to the state memory element after reset. In addition, the retention memory element can also be used by the SoC to maintain the state data for the access control module when power to the access control module is reduced or removed (e.g., when the SoC enters low-power mode, when there is a period of inactivity, etc.). Before transitioning to a low-power state, or as part of the transition, the logic element direct the saving of state data of the access control module in the retention memory element. The logic element can also direct restoration of state data from the retention memory element back to the state memory element after power has been restored to the access control module. As another example, the SoC can include one logic element that controls the retention of security state data through both reset and power-down or power-reduction procedures. Accordingly, one advantage of the described system is reducing the number of components a SoC needs to retain and restore state data through both power-down or power-reduction and reset scenarios by, for example, reusing a retention mechanism to preserve state data in both scenarios.

In some implementations, the save, reset, and restore signals are asserted as part of a reset sequence. The reset sequence can be controlled by hardware of the SoC. For example, a controller for the reset sequence can start the sequence by asserting a save signal that is received by the security component. After a threshold amount of time (e.g., minimum number of clock cycles) or after the save signal is deasserted, the controller can assert a reset signal that is shared by the security component and other components of the SoC. After a threshold amount of time (e.g., minimum number of clock cycles) or after the save signal is deasserted, the controller can assert the restore signal. The reset sequence can be initiated by a hardware or a software trigger. For example, an application can trigger the reset sequence in response to detecting certain conditions that indicate a reset of one or more sub-systems of the SoC should or needs to take place.

In one general aspect, an integrated circuit includes: one or more modules that are configured to be reset in response to a reset signal: an access control module that is configured to be reset in response to the reset signal, where the access control module includes one or more first memory elements to store state data indicating a state of the access control module in the one or more first memory elements, where the access control module is configured such that state data in the one or more first memory elements is cleared in response to the reset signal: one or more second memory elements that is configured to retain stored data during reset of the access control module, the one or more second memory elements being configured to obtain data from the one or more first memory elements in response to a save signal and to provide data to the one or more first memory elements in response to a restore signal: and reset control logic configured to cause the integrated circuit to be reset while the state of the access control module is preserved, the reset control logic being configured to cause the reset by performing a sequence of operations that includes (i) issuing the save signal to cause the one or more second memory elements to obtain, from the one or more first memory elements, the state data that indicates the state of the access control module, (ii) issuing the reset signal to cause the one or more modules and the access control module to be reset, and (iii) issuing the restore signal to cause the state data for the access control module to be restored to the one or more first memory elements from the one or more second memory elements.

Implementations include one or more of the following features. For example, in some implementations, the one or more second memory elements is included in the access control module.

In some implementations, the state data for the access control module specifies a configuration of the access control module or values of settings for the control module, and the access control module is configured to use contents stored in the one or more first memory elements to set operation of the access control module.

In some implementations, the state data includes one or more of an operating setting, an access permission value, an encryption key, a memory pointer, or a mask register value.

In some implementations, the one or more modules comprise at least one of a microcontroller, a microprocessor, a graphics processing unit, a machine learning accelerator, a digital signal processor, a modem, a memory controller, or a disk controller.

In some implementations, the integrated circuit is configured such that issuing the reset signal returns the access control module and the one or more modules to default operating modes for the respective modules.

In some implementations, the one or more modules each have respective memory elements and state data: and the integrated circuit is configured such that issuing the reset signal (i) causes the state data of the access control module in the one or more first memory elements to be cleared or set to a default value, and (ii) causes the state data in the memory element of the one or more modules to be cleared or set to default values.

In some implementations, the reset control logic is configured to receive a reset command and to perform the sequence of operations in response to receiving the reset command.

In some implementations, the one or more second memory elements is a set of retention flip flops that are configured to store state data of the access control module while the access control module is powered down.

In some implementations, the access control module and the one or more first memory elements are powered in a first power domain of the integrated circuit, and where the one or more second memory elements is powered in a second power domain of the integrated circuit that is different from the first power domain that powers the one or more first memory elements and the rest of the access control module.

In some implementations, the integrated circuit includes power management logic configured to cause the state data from the one or more first memory elements to be stored into the one or more second memory elements, be retained while the access control module is powered down, and be restored to the one or more first memory elements after power is returned to the access control module.

In some implementations, the integrated circuit includes power management logic configured to cause the access control module to be powered down while the state of the access control module is preserved, by performing operations includes: before powering down the access control module, issuing the save signal to cause the one or more second memory elements to obtain, from the one or more first memory elements, the state data that indicates the state of the access control module: and after powering up the access control module, issuing the restore signal to cause the state data for the access control module to be restored to the one or more first memory elements from the one or more second memory elements.

In some implementations, each of the one or more first memory elements and the second memory includes volatile memory includes one or more of a latch, a flip flop, or an SRAM.

In some implementations, each of the one or more first memory elements and the one or more second memory elements includes a register file or register bank.

In some implementations, the integrated circuit includes conductors configured to provide the reset signal concurrently to the one or more modules and the access control module such that the one or more modules and the access control module are reset concurrently in response to issuance of the reset signal.

In some implementations, the access control module is configured to perform security services including granting or denying access to resources of the integrated circuit.

In some implementations, the reset control logic includes a state machine configured to issue the save signal, the reset signal, and the restore signal.

In some implementations, the integrated circuit is a system on a chip.

In another general aspect, a method includes: receiving a reset command at an integrated circuit, the integrated circuit includes multiple modules including an access control module and one or more additional modules, where the access control module includes one or more first memory elements to store state data specifying a current state of the access control module, the one or more first memory elements configured to be cleared during reset of the access control module, and where the integrated circuit includes one or more second memory elements configured to retain stored data during reset of the access control module: and in response to receiving the reset command, performing a reset of the multiple modules of the integrated circuit while preserving state data indicating a state of the access control module, including: obtaining the state data of the access control module from the one or more first memory elements and storing the state data in the one or more second memory elements of the access control module: after saving the state data in the one or more second memory elements, resetting the access control module and the one or more additional modules: and after resetting the access control module and the one or more modules, restoring the state of the access control module, including storing the state data from the one or more second memory elements in the one or more first memory elements.

In some implementations, resetting the access control module and the one or more additional modules includes issuing a reset signal, provided to each of the multiple modules, that triggers each of the multiple modules to be concurrently reset.

In some implementations, resetting the access control module and the one or more additional modules includes clearing or setting default values for memory elements of the multiple modules except for the one or more second memory elements.

In some implementations, the integrated circuit includes reset control logic configured to perform the reset by performing a sequence of operations includes (i) issuing a save signal to cause the one or more second memory elements to obtain, from the one or more first memory elements, the state data that indicates the state of the access control module, (ii) issuing a reset signal to cause the access control module and the one or more additional modules to be reset, and (iii) issuing a restore signal to cause the state data for the access control module to be restored to the one or more first memory elements from the one or more second memory elements.

In some implementations, the reset control logic is configured to receive a reset command and to perform the sequence of operations in response to receiving the reset command.

In some implementations, the reset control logic includes a state machine configured to issue the save signal, the reset signal, and the restore signal.

In some implementations, the one or more second memory elements is included in the access control module.

In some implementations, the state data for the access control module specifies a configuration of the access control module or values of settings for the control module, and the access control module is configured to use contents stored in the one or more first memory elements to set operation of the access control module.

In some implementations, the state data includes one or more of an operating setting, an access permission value, an encryption key, a memory pointer, or a mask register value.

In some implementations, the one or more additional modules comprise at least one of a microcontroller, a microprocessor, a graphics processing unit, a machine learning accelerator, a digital signal processor, a modem, a memory controller, or a disk controller.

In some implementations, the integrated circuit is configured such that issuing the reset signal returns the access control module and the one or more additional modules to default operating modes for the respective modules.

In some implementations, the one or more additional modules each have respective memory elements and state data: and the integrated circuit is configured such that issuing the reset signal (i) causes the state data of the access control module in the one or more first memory elements to be cleared or set to a default value, and (ii) causes the state data in the memory element of the one or more additional modules to be cleared or set to default values.

In some implementations, the one or more second memory elements is a set of retention flip flops that are configured to store state data of the access control module while the access control module is powered down.

In some implementations, the access control module and the one or more first memory elements are powered in a first power domain of the integrated circuit, and where the one or more second memory elements is powered in a second power domain of the integrated circuit that is different from the first power domain that powers the one or more first memory elements and the rest of the access control module.

In some implementations, the integrated circuit includes power management logic configured to cause the state data from the one or more first memory elements to be stored into the one or more second memory elements, be retained while the access control module is powered down, and be restored to the one or more first memory elements after power is returned to the access control module.

In some implementations, the integrated circuit includes power management logic configured to cause the access control module to be powered down while the state of the access control module is preserved, by performing operations includes: before powering down the access control module, issuing a save signal to cause the one or more second memory elements to obtain, from the one or more first memory elements, the state data that indicates the state of the access control module: and after powering up the access control module, issuing a restore signal to cause the state data for the access control module to be restored to the one or more first memory elements from the one or more second memory elements.

In some implementations, each of the one or more first memory elements and the second memory includes volatile memory includes one or more of a latch, a flip flop, or an SRAM.

In some implementations, each of the one or more first memory elements and the one or more second memory elements includes a register file or register bank.

In some implementations, the integrated circuit includes conductors configured to provide a reset signal concurrently to the one or more additional modules and the access control module such that the one or more modules and the access control module are reset concurrently in response to issuance of the reset signal.

In some implementations, the access control module is configured to perform security services including granting or denying access to resources of the integrated circuit.

In some implementations, the integrated circuit is configured to use the one or more second memory elements to retain state data of the access control module when the access control module is powered down in addition to during reset of the access control module.

Other embodiments of these aspects include corresponding electronic devices and non-transitory machine-readable media.

The subject matter described in this specification can be implemented in particular embodiments so as to realize one or more of the following advantages. For example, the SoC can achieve the effect of a partial reset of the SoC with enhanced security. In many cases, the operations to re-create desired settings in a security component of an SoC have a high cost in time and power. As a result, it is desirable to not reset the security component under many conditions when the rest of the SoC is reset. Nevertheless, many prior techniques for separating reset of security components from other modules of an SoC have undesirable effects. For example, implementing separate reset domains in the SoC requires more complicated management and often requires reset isolation logic. Reset isolation logic is often needed to ensure that, as values fluctuate at the inputs to the security component during reset of the rest of the SoC, the reset does not change the state of the security component. The reset isolation logic adds delays in the timing path which can cause differences in the times when different components are reset. This can present a security vulnerability in some circumstances. For example, a transaction to configure the security component may be in progress at the time a reset is initiated. In this case, signal delays due to the presence of the reset isolation logic could result in an incorrect setting value being captured in the security component, which could compromise the security of the SoC. The technique described herein avoids the delays of traditional reset isolation logic and avoids the need for traditional separate reset domains, as the security component is actually reset along with other components. In addition, the technique enables the effect of a partial reset by preserving state data and restoring the state of the security component from the stored data after reset. This way, the SoC gains the security of concurrent reset as well as the power savings and speed advantages of not having to re-configure the security component after each reset.

As discussed further below; the benefits of increased efficiency and increased security can be achieved, at least in part, by a security component of the SoC and one or more other components of the SoC each receiving and being reset in response to the same reset signal, which can be provided concurrently or synchronously to the various components. In addition, the security component includes a retention mechanism to preserve the state of the security component through the reset process. For example, because the SoC is designed so that many or all of the modules of the SoC are reset in response to the same reset signal, the SoC does not need reset isolation logic to create separate reset domains within the SoC. This reduces the amount of logic in the reset timing path and so avoids delays that isolation logic often creates. While other approaches may need to establish reset boundaries between security components of the SoC and other SoC components, or may need to manage multiple reset signals for different reset domains, the present approach does not need these elements to achieve the effect of a partial or selective reset of some but not all SoC modules. Providing the reset signal to and the security component and other components of the SoC eliminates the need for at least one of these boundaries because the security component and the other components are reset at substantially the same time when the reset signal is asserted. This concurrent reset of SoC components has the added benefit of preventing or reducing the likelihood of the security component capturing an incorrect or inappropriate value as a result of an in-flight transaction from another component of the SoC when the reset signal was asserted. Moreover, by simplifying the reset timing path and reducing the number of asynchronous reset signals, the described architecture reduces the likelihood of the SoC experiencing other unexpected or undesirable behaviors. For these reasons, the described architecture can reduce the errors that a SoC experiences and improve the security of the SoC during or following a reset.

Additionally, reset functionality of security components provides a number of benefits over the powering down or power reduction of the security components including time and efficiency benefits. For example, a reset of a security component using the techniques described would typically take less time and use less power than that amount of time and power needed to perform a power-down or power-reduction procedure (e.g., save state data of a security component, reduce power to the security component, restore power to the security component, and restore state data of the security component). These benefits would be particularly noticeable in situations where the security component is actively being used. However, the power-down or power-reduction functionality may provide certain efficiency benefits in other scenarios, such as when the security component is not actively being used (e.g., is not receiving transactions from other components of the SoC or has not received transactions from the other components in a threshold amount of time).

The described architecture of the SoC can achieve additional benefits, at least in part, by the security component of the SoC and the one or more other components of the SoC sharing the reset signal and by the security component including the retention mechanism. For example, using a shared reset signal can reduce the time required to perform an asynchronous reset of an SoC by reducing the number of reset isolation logic elements in the reset timing path that are typically required to establish reset boundaries and manage multiple reset signals. Accordingly, the described architecture can maintain the state of the security component through reset while reducing the time needed to typically perform an asynchronous reset.

BRIEF DESCRIPTION OF THE DRAWINGS

FIGS. 3A-3D are diagrams of an example access control module that uses a retention mechanism to save and restore state data during different stages of a reset.

Like reference numbers and designations in the various drawings indicate like components.

DETAILED DESCRIPTION

Figure 1:
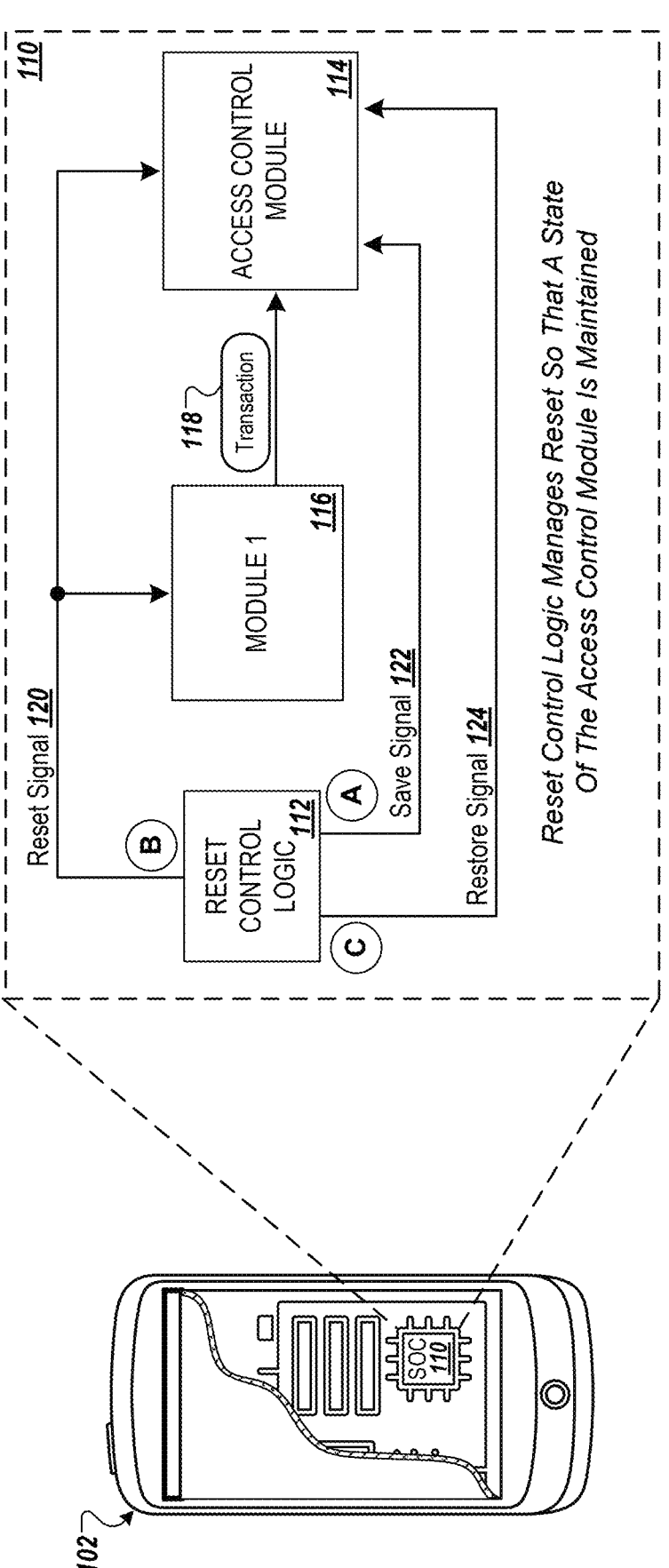
FIG. 1 is a diagram of an example system on chip having a architecture that enables reset using a shared reset signal, and that enables maintenance and restoration of state data using a retention control signal.

FIG. 1 is a diagram of an example system on chip (SoC) 110 having a architecture that controls reset of multiple modules of the SoC 110 using reset control logic 112 that manages the reset of the multiple modules. The SoC 110 can be part of a computing device 102. The multiple modules of the SoC 110 can include an access control module 114 that performs security services for the SoC 110 and a module 116 (Module 1) that interacts with the access control module 114. The access control module 114 can represent a security sub-system of the SoC 110 or be a part of the SoC 110's security sub-system. The module 116 can represent all or part of another sub-system of the SoC 110, such as an application sub-system, a network sub-system, or the like. As shown, the access control module 114 and the module 116 share a reset line such that both receive a reset signal 120 from the reset control logic 112. This reset line can also be shared with one or more other modules of the SoC 110 that, for example, represent other sub-systems of the SoC 110. The SoC 110 includes a retention mechanism managed by the reset control logic 112 to preserve state data of the access control module 114 through the reset process and, later, restore the preserved state data to restore a prior state of the access control module 114.

The computing device 102 can be a server, a desktop computer, or a mobile computing device such as a smart phone, a laptop computer, a tablet computing device, a PDA, etc.

The reset control logic 112 can be a logic element such as a hardware or software controller that manages a reset of multiple modules of the SoC 110. The reset control logic 112 can be implemented as combinatorial logic, implementation of a finite-state machine (e.g., a sequential logic system), or other circuitry. The reset control logic 112 can assert different signals across signal lines that electrically connect the reset control logic 112 with modules of the SoC 110. The reset control logic 112 can assert these signals in response to particular conditions being met such as the occurrence of particular events. As an example, the reset control logic 112 can start a reset sequence in response to a reset trigger. The reset sequence can involve issuing a particular sequence of control signals in the proper order, such as the assertion of the save signal 122, followed by the assertion of the reset signal 120, followed by the assertion of the restore signal 124 as described in more detail below. The reset trigger can be a reset command, such as an instruction from an operating system to initiate a reset, or a type of user input, such as user pressing a button or other control of a device.

The access control module 114 and the module 116 can represent different sub-systems or domains of the SoC 110. The access control module 114 is a security sub-system for the SoC 110 or a part of the security sub-system for the SoC 110. Therefore, the access control module 114 can provide security services for the SoC 110, such as restricting access to resources of the SoC, verifying credentials and authorization to access resources of the SoC, limiting or applying conditions to changes to configuration of the SoC, encrypting or decrypting data, verifying the authenticity and integrity of received transactions, and providing key management. For example, the access control module 114 can be used to provide authorized access to, and prevent unauthorized access to, data and processing resources of the SoC 110.

In some implementations, the access control module 114 provides other functions for the SoC 110. For example, the access control module 114 can protect confidential keys from being revealed to an application or to other components of the SoC 110.

The module 116 can represent another sub-system of the SoC 110 or part of another sub-system of the SoC 110. For example, the module 116 can represent an application sub-system of the SoC 110, a GPU sub-system of the SoC 110, a CPU sub-system of the SoC 110, a networking sub-system of the SoC 110, a DSP sub-system of the SoC 110, etc.

In some implementations, access to the services of the access control module 114 may be limited to particular applications or particular components of the SoC 110. For example, only certain modules of the SoC 110 may be able to send data to and/or receive data from the SoC 110. As another example, only an authenticated application can call for services provided by the access control module 114.

The access control module 114 can include one or more security components, such as security registers, for storing secret, sensitive, personal, or otherwise private information. For example, a security register can store security data such as cryptographic keys, digital rights management (DRM) keys, passwords, biometric data (e.g., fingerprint scan data, iris scan data, etc.), usernames or IDs, or the like. The security data stored by the security register can be state data for the access control module 114. As discussed further below, the access control module 114 can also store additional information specifying parameter values and other settings that set the current configuration and operating behavior of the access control module 114. The values in security registers or other data storage elements can store the values that set how the access control module 114 operates and interacts with other modules. For example, the access control module 114 can be configured to store settings in a security register when a configuration change is made, and the access control module 114 can read the settings from the security register and operate according to the settings specified.

In some implementations, the SoC 110 includes one or more other modules in addition to the access control module 114 and the module 116. For example, the SoC 110 can include a third module that also shares the reset signal 120 with the module 114 and the module 116. The third module may represent another sub-system of the SoC 110 or part of another sub-system of the SoC 110. For example, if the access control module 114 represents a security sub-system of the SoC 110 and the module 116 represents an application sub-system of the SoC 110, the third module can represent a GPU sub-system of the SoC 110. In general, the SoC 110 can include any appropriate number of modules, each of which can be reset in response to the same reset signal 120.

The example of FIG. 1 illustrates an example of carrying out reset of the SoC 110 in a manner that preserves and then restores the state of the access control module 114. The example shows operations and a flow of data described in three stages labeled (A) to (C). The operations shown may be triggered by a command or request for reset, which could be initiated by software, by a user, or in another manner.

As shown, in a first stage, stage (A), when the reset control logic 112 determines that a reset of the SoC 110 should occur, the reset control logic 112 first initiates saving of state data for the access control module 114 before initiating reset of the SoC 110. To cause the current state of the access control module 114 to be saved, the reset control logic 112 asserts a save signal 122 that the access control module 114 receives. Asserting the save signal 122 can include transmitting a predetermined signal value or pattern along a save signal line between the reset control logic 112 and the access control module 114. For example, the reset control logic 112 can assert the save signal 122 by changing the value of the save signal 122 from "0" to "1" (e.g., predetermined value of 1). Alternatively, the reset control logic 112 can assert the save signal 122 by changing the value of the save signal 122 from "1" to "0" (e.g., predetermined value of 0)).

In response to the assertion of the reset signal 120, the access control module 114 can save its current state in a set of one or more memory elements (e.g., set of retention memory elements) that are not subject to the reset as described below with respect to FIGS. 2 and 3A-3D. In other words, the contents of the retention memory elements are not altered by the reset process, e.g., not cleared, overwritten, initialized, or otherwise changed. The state data saved in the set of retention memory elements can include security settings of the access control module 114 (e.g., encryption or decryption settings, masking parameters), configuration information of the access control module 114, or stored security data (e.g., permission keys, mask register contents, memory pointers or references to memory addresses, etc.), or any other information indicating the state of the access control module 114. The reset control logic 112 can assert the save signal 122 before asserting the reset signal 120. The reset control logic 112 also deasserts the save signal 122 before asserting the reset signal 120, so that the retention elements do not capture any values that are changed during reset. Thus, prior to reset, thee retention memory elements store the state of the access control module 114 prior to reset.

In a second stage, stage (B), the reset control logic 112 asserts the reset signal 120 that both the access control module 114 and the module 116 receive. The SoC 110 can be designed so that modules of the SoC 110 receive the same reset signal 120 concurrently and synchronously. The reset control logic 112 asserts the reset signal 120 after the assertion and deassertion of the save signal 122 in stage (A). Asserting the reset signal 120 can include transmitting a predetermined signal value or pattern along a reset signal line between the reset control logic 112, the access control module 114, and the module 116. For example, the reset control logic 112 can assert the reset signal 120 by changing the value of the reset signal 120 from "0" to "1" (e.g., where a predetermined value of 1 triggers reset). Alternatively, the reset control logic 112 can assert the reset signal 120 by changing the value of the reset signal 120 from "1" to "0" (e.g., where a predetermined value of 0 triggers reset).

In some implementations, the reset control logic 112 asserts the reset signal 120 in response to a deassertion of the save signal 122. For example, the deassertion of the save signal 122 can trigger the assertion of the reset signal 120 substantially immediately, on the next edge (e.g., leading edge, falling edge, etc.) of a clock of the SoC 110, or after a minimum amount of time (e.g., predetermined clock cycles). The reset control logic 112 can be part of a controller that uses sequential logic to implement a state machine that asserts and deasserts the appropriate control signals with a predetermined sequence, and according to predetermined timing and/or detection of predetermined conditions.

In some implementations, the reset control logic 112 asserts the reset signal 120 after a predetermined amount of time since the save signal 122 was asserted. For example, the reset control logic 112 can assert the reset signal 120 after a predetermined number of clock cycles have passed since the save signal 122 was asserted. The predetermined number of clock cycles can also indicate a time for when the save signal 122 is deasserted by the reset control logic 112 such that the save signal 122 is deasserted and the reset signal 120 is asserted at substantially the same time. Alternatively, a second predetermined number clock cycles less than the predetermined number of clock cycles can be used to indicate a time for when the save signal 122 is deasserted by the reset control logic 112 such that the save signal 122 is deasserted before the reset signal 120 is asserted to ensure that saving of state data ends before the state data is cleared. This can prevent preserved state data from being overridden with blank data resulting from the reset of the access control module 114.

In response to the reset signal 120 being asserted, data in the access control module 114 and the module 116 is cleared. For example, state data not stored in the set of retention memory elements of the access control module 114 is cleared in response to the reset signal 120 being asserted, and memory elements and processing elements are returned to a default or re-initialized state. In more detail, state data indicating the current configuration of the access control module 114, security settings of the access control module 114, and/or a subset of security information being used by the access control module 114 can be cleared from a different set of one or more memory elements (e.g., set of state memory elements) of the access control module 114 to reset the access control module 114. The data cleared from the module 116 in response to the assertion of the reset signal 120 can also include state data for the module 116, other data stored in the module 116, or both the state data and other data.

The concurrent reset of the both the access control module 114 and the module 116 provides various security benefits. As an example, the module 116 may initiate a transaction 118 (e.g., a command, instruction, request, etc.) with the access control module 114 that can cause a configuration change to occur in the access control module 114. If there were significant delays between reset of the modules 114, 116, and if the transaction 118 were in incomplete at the time reset is initiated, the result may be uncertain and could potentially cause the access control module 114 to be incorrectly configured. This risk is avoided in the techniques described herein by concurrently resetting the access control module 114 with the module 116. With this technique, the SoC 110 prevents or reduces the likelihood of the access control module 114 being misconfigured by incomplete or outdated transactions which could introduce a security vulnerability or cause an error. As a result, the concurrent reset improves the security of the SoC 110 and reduces the likelihood of the access control module 114 experiencing an error.

Once the reset signal has been asserted for an appropriate duration of time, the reset control logic 112 deasserts the reset signal. For example, the reset signal can be deasserted based on determining that a predetermined amount of time has passed, or in response to receiving confirmation that modules of the SoC 110 received the reset signal or completed the reset process.

In a third stage, stage (C), after reset has been performed and the reset signal is deasserted, the reset control logic 112 instructs the access control module 114 to restore its previous state which was maintained in the retention memory elements. The reset control logic 112 can instruct this stat restoration by asserting the restore signal 124, which is provided to the access control module 114. The reset control logic 112 asserts the restore signal 124 after the assertion of the reset signal 120. For example, the reset control logic 112 can assert the restore signal 124 after a deassertion of the reset signal 120. Asserting the restore signal 124 can include transmitting a predetermined signal value or pattern along a restore signal line between the reset control logic 112 and the access control module 114. For example, the reset control logic 112 can assert the restore signal 124 by changing the value of the restore signal 124 from "0" to "1" (e.g., where a predetermined value of 1 triggers transfer of data from retention memory elements to the main memory elements that were cleared in the reset). Alternatively, the reset control logic 112 can assert the restore signal 124 by changing the value of the restore signal 124 from "1" to "0" (e.g., where a predetermined value of 0 triggers restoration of state data from the retention memory elements).

In some implementations, the reset control logic 112 asserts the restore signal 124 in response to a deassertion of the reset signal 120. For example, the deassertion of the reset signal 120 can trigger the assertion of the restore signal 124 substantially immediately, on the next edge (e.g., leading edge, falling edge, etc.) of a clock of the SoC 110, or after waiting a minimum amount of time (e.g., predetermined clock cycles).

In some implementations, the reset control logic 112 asserts the restore signal 124 after a predetermined amount of time since the reset signal 120 was asserted. For example, the reset control logic 112 can assert the restore signal 124 after a predetermined number of clock cycles have passed since the save signal 122 was asserted. The predetermined number of clock cycles can also indicate a time for when the reset signal 120 is deasserted by the reset control logic 112 such that the reset signal 120 is deasserted and the restore signal 124 is asserted at substantially the same time. Alternatively, a second predetermined number clock cycles less than the predetermined number of clock cycles can be used to indicate a time for when the reset signal 120 is deasserted by the reset control logic 112 such that the reset signal 120 is deasserted before the restore signal 124 is asserted to ensure that clearing of state data ends before the preserved state data is restored. This can prevent restored state data from being cleared by the reset.

In response to the restore signal 124 being asserted, the preserved state data is restored to restore the prior state of the access control module 114. For example, the set of state memory elements captures the state data stored in the set of retention memory elements to restore the state of the access control module 114. In more detail, the prior security settings, configuration, and/or security data of the access control module 114 before the assertion of the reset signal 120 are restored.

The SoC 110's architecture provides a number of benefits. For example, the described architecture of the SoC 110 can achieve reduced errors and improved security during or following a reset. This benefit is achieved, at least in part, by the access control module 114 of the SoC 110 and one or more other components of the SoC responding to the same reset signal 120 and by the access control module 114 including a retention mechanism to preserve the state of the access control module 114 through the reset. For example, using the shared reset signal 120 can reduce the number of reset isolation logic elements in the reset timing path (e.g., functional timing path) that might otherwise be needed to (i) establish a boundary between the module 116 and the access control module 114 and (ii) manage multiple reset signals for the module 116 and the access control module 114. Providing the reset signal 120 to other components of the SoC 110 and the access control module 114 eliminates the need for at least this reset domain boundary because the access control module 114 and the module 116 (as well as some or all other modules of the SoC 110) are reset at substantially the same time when the reset signal 120 is asserted. However, isolation may still be needed on functional paths (e.g., functional timing paths) that belong to different reset domains of the SoC 110, such as between other groups of modules of the SoC 110 and a group of modules that includes the module 116 and the access control module 114.

This concurrent reset of the access control module 114 and one or more other components of the SoC 110 has the added benefit of preventing or reducing the likelihood of the access control module 114 capturing an incorrect or outdated value as a result of being configured by an in-flight transaction from another component of the SoC 110 when the reset signal 120 was asserted. Moreover, by simplifying the reset timing path and reducing the number of asynchronous reset signals, the described architecture reduces the likelihood of the SoC 110 experiencing other unexpected or undesirable behaviors. For these reasons, the described architecture can reduce the errors that the SoC 110 experiences and improve the security of the SoC 110 during or following a reset.

Figure 2:
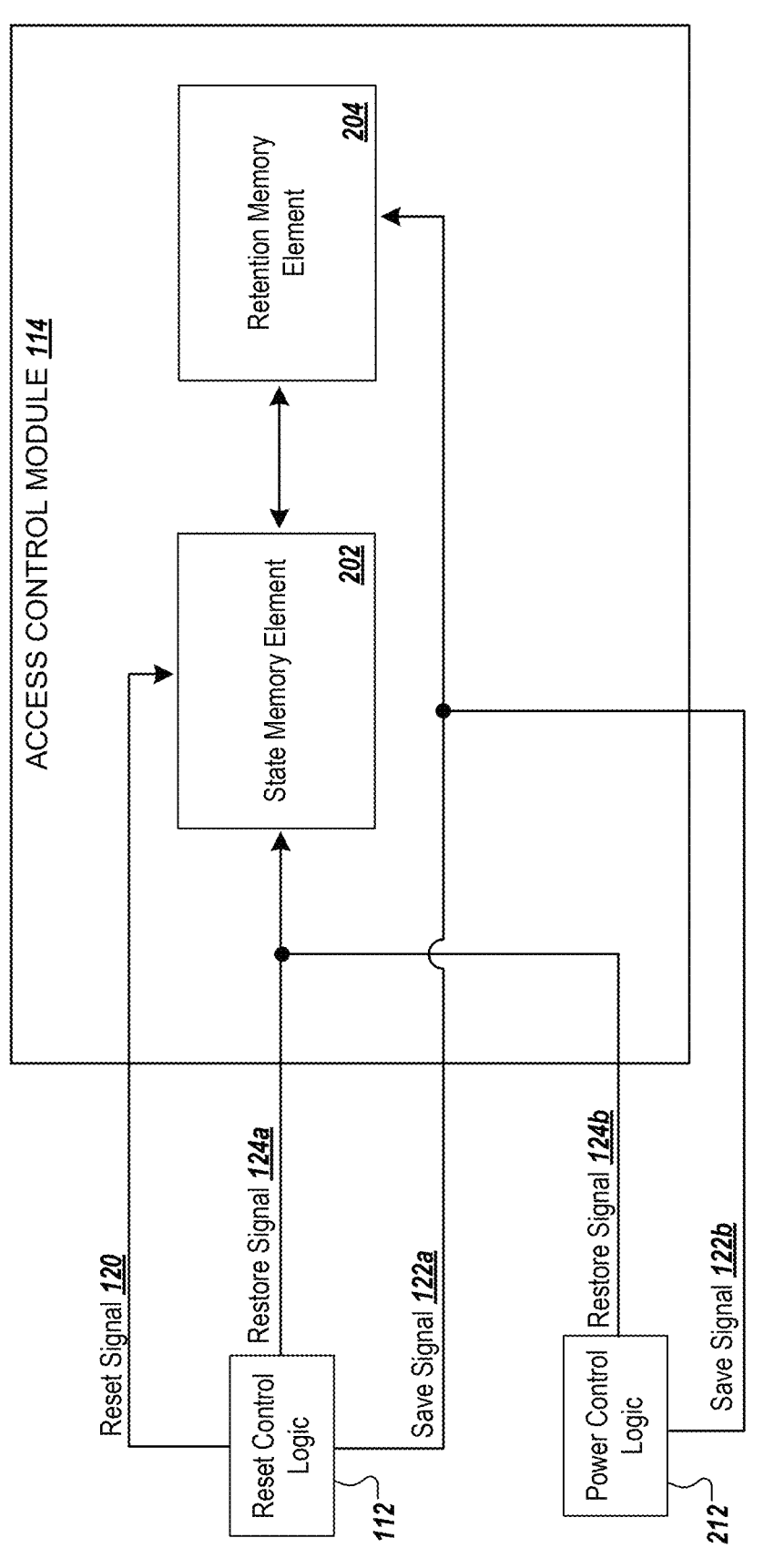
FIG. 2 is a diagram of an example access control module that uses a retention mechanism to save and restore state data during a reset process.

FIG. 2 is a diagram of the example access control module 114 that uses a retention mechanism to save and restore state data during a reset process. For example, the access control module 114 can include a retention memory element 204 that is used to preserve state data of the access control module 114 through a reset and to restore the state data to a state memory element 202 after the reset.

The state memory element 202 can store state data or a subset of state data of the access control module 114. For example, the state memory element 202 can store security settings of the access control module 114, configuration information of the access control module 114, or security data of the access control module 114.

The state memory element 202 can include, for example, a set of flip-flops that are used to store the state data. As an example, the flip-flops in the set of flip-flops can be "data" or "delay" flip-flops.

In some implementations, the state memory element 202 uses components other than flip-flops to store state data. For example, the state memory element 202 can include one or more dynamic storage elements that store information in capacitance. Other examples of components that the state memory element 202 can use include latches, registers, memory such as SRAM, or the like.

The retention memory element 204 can include, for example, a set of latches that are used to capture state data from the state memory element 202 in response to a save signal 122_a_ or a save signal 122_b_ being asserted. The latches in the set of latches can be level-triggered latches that, for example, capture data from the state memory element 202 when enabled regardless of whether the clock of the SoC 110 is high or low. Alternatively, the latches in the set of latches can be edge-triggered latches that, for example, capture data from the state memory element 202 on a rising edge of the clock of the SoC 110 or a falling edge of the clock of the SoC 110. As an example, the latches in the set of latches can be data-retention latches. The retention memory element 204 can include, for example, a set of flip-flops that are used to store the state data. As an example, the flip-flops in the set of flip-flops can be "data" or "delay" flip-flops. The state memory element 202 uses components other than flip-flops to store state data. For example, the state memory element 202 can include one or more dynamic storage elements that store information in capacitance. Other examples of components that the state memory element 202 can use include latches, registers, memory such as SRAM, or the like.

The state memory element 202 and retention memory element 204 are each referred to in the singular for convenience in description, but either or both can include multiple memory elements. For example, each can represent a register bank or collection of memory cells or data storage devices. The state memory element 202 and retention memory element 204 are typically implemented using volatile memory but in some implementations may be implemented using non-volatile memory (e.g., flash memory, ferroelectric random-access memory (FeRAM), magnetic random-access memory (MRAM), phase-change memory (PCM), resistive random-access memory (RRAM), etc.).

As shown, the retention memory element 204 can receive the save signal 122*a* and the save signal 122*b*. The state memory element 202 can receive the restore signal 124*a* and the restore signal 124*b*. In response to the save signal 122*a* being asserted, the retention memory element 204 can capture whatever values are currently stored in the state memory element 202 that represents all or a portion of the access control module 114's state data. The save signal 122*a* can, for example, change the state of the latches in the set of latches. For example, the assertion of the save signal 122*a* can change the state of the set of latches to enable the latches to capture state data from the state memory element 202.

As will be discussed in more detail below, the data stored in the retention memory element 204 is not subject to a reset of the access control module 114. However, the data stored in the state memory element 202 is affected by (e.g., is overwritten or cleared by) reset of the access control module 114. For example, in response to the reset signal 120 being asserted, the data in the state memory element 202 would be cleared but the data in the retention memory element 204 would remain unaffected.

In response to the restore signal 124*a* being asserted, the state memory element 202 can capture the values preserved in the retention memory element 204. The restore signal 124*a* can, for example, change the state of the flip-flops in the set of flip-flops. For example, the assertion of the restore signal 124*a* can change the state of the set of flip-flops to enable the flip-flops to capture the preserved state data stored in the retention memory element 204.

The SoC 110 can include the reset control logic 112 described above with respect to FIG. 1 that manages reset of the access control module 114 and one or more other components of the SoC 110 such that state data of the access control module 114 is preserved through the reset. The reset control logic 112 can include, for example, a set of logic gates that are used to generate the save signal 122*a*, the reset signal 120, and the restore signal 124*a*.

The state memory element 202 can be the source to which the access control module 114 looks to determine its behavior. In other words, the values stored in the state memory element 202 can direct the actions and configuration used by the access control module 114. The state memory element 202 and the retention memory element 204 are typically both volatile memory, and so would fail to retain data if power were removed. In the access control module 114, the state memory element 202 and the retention memory element 204 can be powered in separate power domains. In particular, the SoC 110 can be configured to distribute power so that even as power to the state memory element 202 and the rest of the access control module 114 is removed, separate power rails can power the retention memory element 204 so that stored values are retained.

The SoC 110 can also include power control logic 212 that is used to manage powering down the access control module 114 or reducing power to the access control module 114 while preserving state data of the access control module 114. The power control logic 212, like the reset control logic 112, can combinatorial logic, sequential logic, a processor with instructions or executable firmware or software, etc. The power control logic 212 manages changes to power for the SoC 110, such as transitioning to or from low-power modes (e.g., a sleep mode, an idle mode, a standby mode, etc.), which may include turning off or reducing power to the access control module 114 of the SoC 110 and then consequently restoring power. The power control logic 212 can assert different signals across lines that electrically connect the power control logic 212 with the access control module 114 of the SoC 110. The power control logic 212 can assert these signals in response to particular conditions being met such as the occurrence of particular events. As an example, the power control logic 212 can start a power-down or power-reduction sequence of the access control module 114 in response to a triggering event, such as an instruction from the operating system to enter a low-power mode or a press of an on/off button by a user. In some implementations, the power control logic 212 can detect other conditions, such as a period of no activity for the access control module 114 or there being no activity for the access control module 114 for a predetermined threshold period of time (e.g., the access control module 114 has not received a transaction from another module in the last minute, last five minutes, last thirty minutes, etc.), the access control module 114 has been scheduled to enter a power-saving or inactive mode, the SoC 110 or device 102 has entered or is scheduled to enter a power-saving or inactive mode, etc.

The power-down or power-reduction sequence can include the assertion of the save signal 122*b* before power to the access control module 114 is reduced or before the access control module 114 is powered down, followed by the assertion of the restore signal 124*b* after power to the access control module 114 is restored or fully-restored. After the save signal 122*b* is asserted and before the restore signal 124*b* is asserted, power to the access control module 114 can be reduced. For example, one or more power rails that provide power to the state memory element 202 can be turned off, resulting in the state data in the state memory element 202 being cleared. However, one or more power rails that provide power to the retention memory element 204 can remain on through the power-down or power-reduction sequence of the access control module 114 so that the state data stored in the retention memory element 204 is preserved through the power-down or power-reduction sequence. Using the power control logic 212 to manage powering down the access control module 114 or reducing the power to the access control module 114 while preserving the state data of the access control module 114 provides a number of benefits including reducing the amount of processing resources that are spent or that are needed to perform these tasks (e.g., saving state data of the access control module 114, powering down or reducing power to the access control module 114, and restoring state data to the access control module 114).

In some implementations, the reset control logic 112 and the power control logic 112 are part of the same logic element. For example, the reset control logic 112 and the power control logic 112 can be part of the same hardware or software controller. In more detail, the save signals 122*a* and 122*b* can be a single save signal generated by the single logic element. The restore signals 124*b* and 124*b* can also or alternatively be a single restore signal generated by the single logic element.

In some implementations, the reset control logic 112 and the power control logic 112 are part of separate logic elements, e.g., separate regions or modules of an integrated circuit. For example, the reset control logic 112 can be a first hardware controller on the SoC 110 and the power control logic 112 can be second hardware controller on the SoC 110. The first hardware controller and the second hardware controller may share, or each connect to (potentially through buffers, logic gates, and other components), signal lines that electrically connect to the access control module 114, such as a save signal line that connects to the retention memory element 204 and a restore signal line that connects to the state memory element 202. The reset control logic 112 and the power control logic 212 may communicate with each other or may receive control instructions from another component of the SoC 110 (e.g., software run by a processor of the SoC 110, an input or device outside the SoC 110, etc.) that prevents the reset control logic 112 and the power control logic 212 from generating save signals and/or restore signals at overlapping times, or asserting save signals and/or restore signals at overlapping times.

In managing a reset of the access control module 114, the reset control logic 112 can, for example, use different sets of logic gates to generate the save signal 122a, the reset signal 120, and the restore signal 124a. For example, the reset control logic 112 can include a first set of one or more logic gates that are used to generate the save signal 122a. The reset control logic 112 can also include a second set of one or more logic gates that are used to generate the reset signal 120 that is provided to the access control module 114 and one or more other modules of the SoC 110 and that is based on the save signal 122a. The reset control logic 112 can also include a third set of one or more logic gates that are used to generate the restore signal 124b based on the reset signal 120.

In more detail, the first set of logic gates for the save signal 122a can provide an output of "0" during normal operation of the access control module 114 and then an output of "1" when a reset process is initiated. For example, the save signal 122a output by the reset control logic 112 can go from having an output value of "0" to an output value of "1" in response to occurrence of an event that triggers reset or in response to a set of conditions for reset being met. The output of "1" for the save signal 122a may be maintained for a period of time (e.g., predetermined number of clock cycles) before being deasserted. The output for the save signal 122a may be "0" for other times (e.g., all other times).

Continuing the example, the second set of logic gates for the reset signal 120 can provide an output of "1" after the save signal 122a is deasserted (e.g., after the save signal goes from "1" to "0"). The output of "1" for the reset signal 120 may be maintained by the reset control logic 112 for a period of time (e.g., predetermined number of clock cycles). The output for the reset signal 120 may be "0" for other times (e.g., all other times).

Continuing the example, the third set of logic gates for the restore signal 124a can provide an output of "1" after the reset signal 120 is deasserted (e.g., after the reset signal 120 goes from "1" to "0"). The output of "1" for the restore signal 124 may be maintained by the reset control logic 112 for a period of time (e.g., predetermined number of clock cycles). The output for the restore signal 122 may be "0" for other times (e.g., all other times).

The timing for asserting and deasserting the save signal 122a, the reset signal 120, and the restore signal 124 can be predetermined. For example, the reset control logic 112 can start a reset sequence in response to a triggering event that dictates asserting of the save signal 122a on the next rising edge of a clock of the SoC 110, maintaining the assertion of the save signal 122a for eight clock cycles, deasserting the save signal 122a on the next rising edge of clock after the eight clock cycles, asserting the reset signal 120 on the next rising edge of the clock after save signal 122a is deasserted, maintaining the assertion of the reset signal 120 for eight clock cycles, deasserting the reset signal 120 on the next rising edge of clock after the eight clock cycles, asserting the restore signal 124a on the next rising edge of the clock after reset signal 120 is deasserted, maintaining the assertion of the restore signal 124a for eight clock cycles, and deasserting the restore signal 124b on the next rising edge of clock after the eight clock cycles.

FIGS. 3A-3D are diagrams of the example access control module 114 that uses a retention mechanism to save and restore state data during different stages of reset.

Figure 3A:
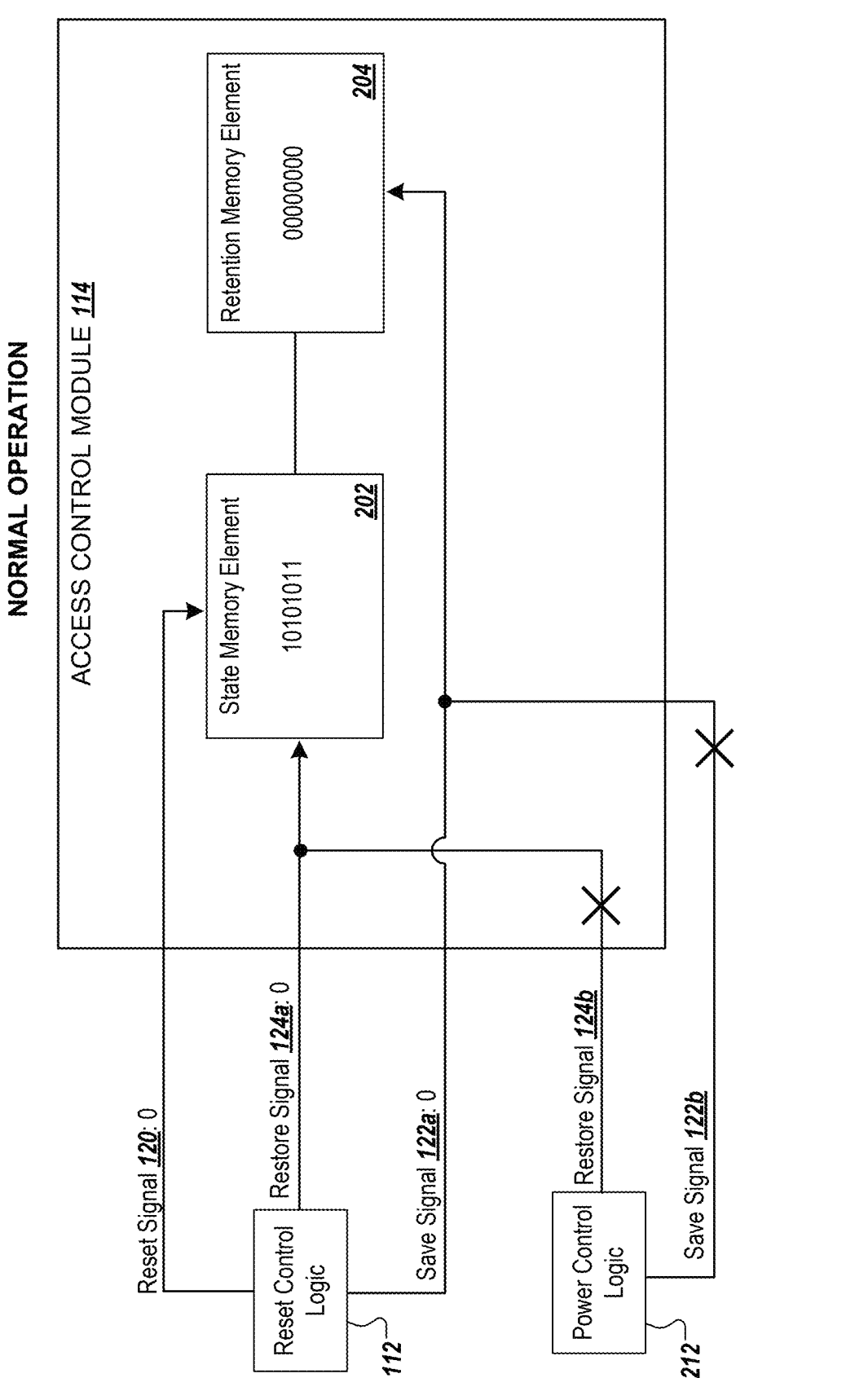

FIG. 3A shows a diagram of the example access control module 114 during normal operation before the reset signal 120 is asserted. In normal operation, the state memory element 202 retains state data of the access control module 114 and the retention memory element 204 is unused. As shown, the state data stored in the state memory element 202 is represented as a binary value of "10101011."

As an example, each flip-flop of the set of flip-flops of the state memory element 202 can store a single bit of information. Together, the set of flip-flops scan store the state data of the access control module 114 or a portion of the module 114's state data. For example, the flip-flops of the state memory element 202 can store a binary value of 10101011 that represents a security setting for the access control module. A first flip-flop of the set can store the first bit of information of the security setting (e.g., "1"), a second flip-flop of the set can store the second bit of information of the security setting (e.g., "0"), a third flip-flop of the set can store the third bit of information of the security setting (e.g., "1"), etc.

As shown, during normal operations, each of the signals provides by the reset control logic 112 is deasserted. For example, the output of the save signal 122a is "0", the output of the reset signal 120 is "0", and the output of the restore signal 124a is "0."

FIG. 3B shows a diagram of the example access control module 114 once the save signal 122a is asserted. As shown, in response to the save signal 122a being asserted, the retention memory element 204 saves (e.g., captures) the state data stored in the state memory element 202. For example, in response to the save signal 122a being asserted, the retention memory element 204 captures and stores the binary value "10101011."

As an example, the output of the save signal 122a provided by the reset control logic 112 has changed from "0" under normal operation as described above with respect to FIG. 3A to "1" to indicate that the save signal 122a is being asserted by the reset control logic 112.

Figure 3C:
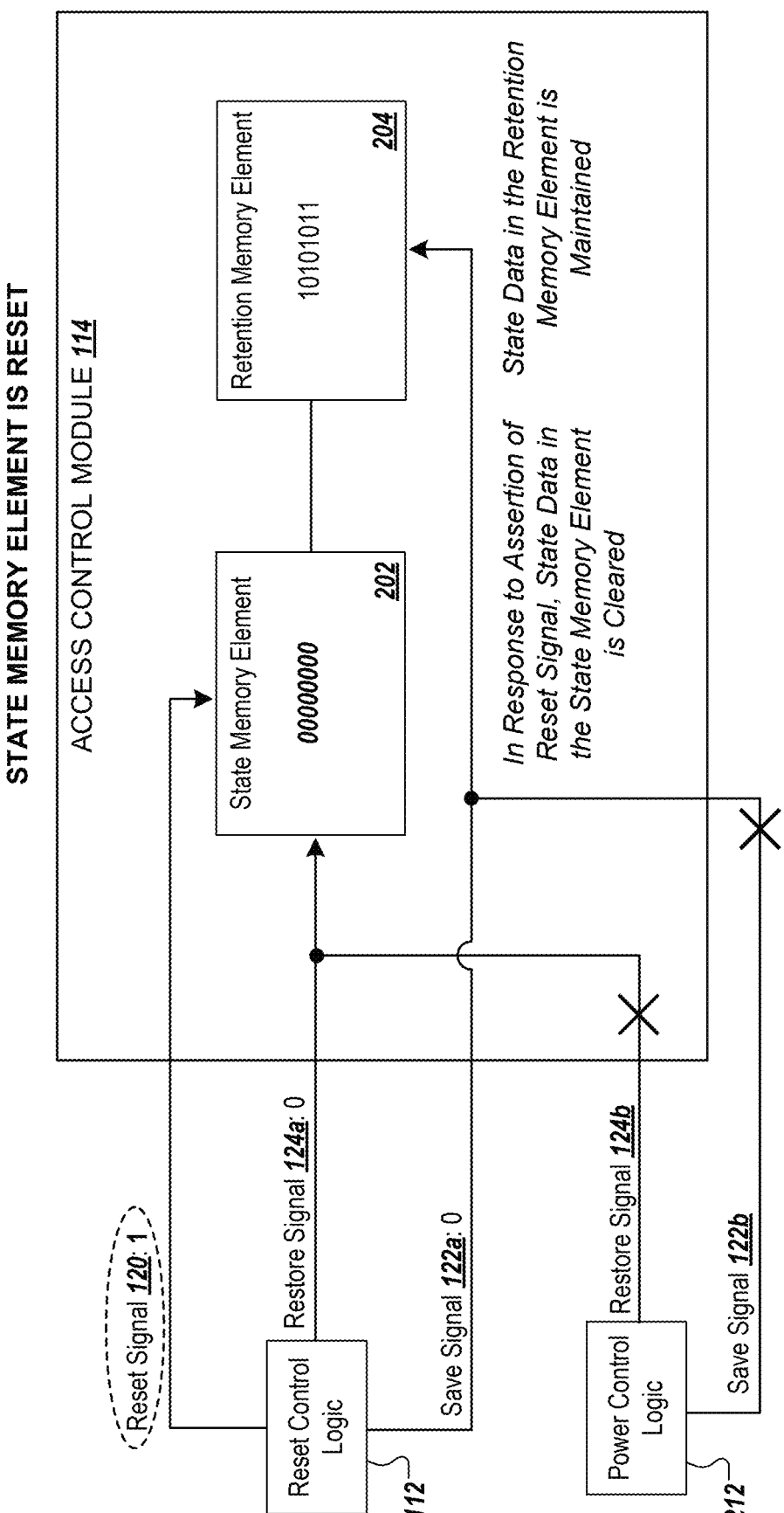

FIG. 3C shows a diagram of the example access control module 114 when the state memory element 202 is reset after the reset signal 120 is asserted. In this stage, the save signal 122a is deasserted and the state data previously stored in the state memory element 202 is cleared. The state data in the state memory element 202 can be cleared after the state data is saved in the retention memory element 204 as a result of the reset signal 120 being asserted. For example, after the state data in the state memory element 202 is cleared, the state data stored in the state memory element 202 can be a binary value of "00000000" as a result of access control module 114 carrying out a reset.

As an example, the output of the reset signal 120 provided by the reset control logic 112 has changed from "0" under normal operation (e.g., as shown in FIG. 3A) and when the save signal 122a has been asserted (e.g., as shown in FIG.

3B) to "1" to indicate that the reset signal 120 is being asserted by the reset control logic 112.

Figure 3D:
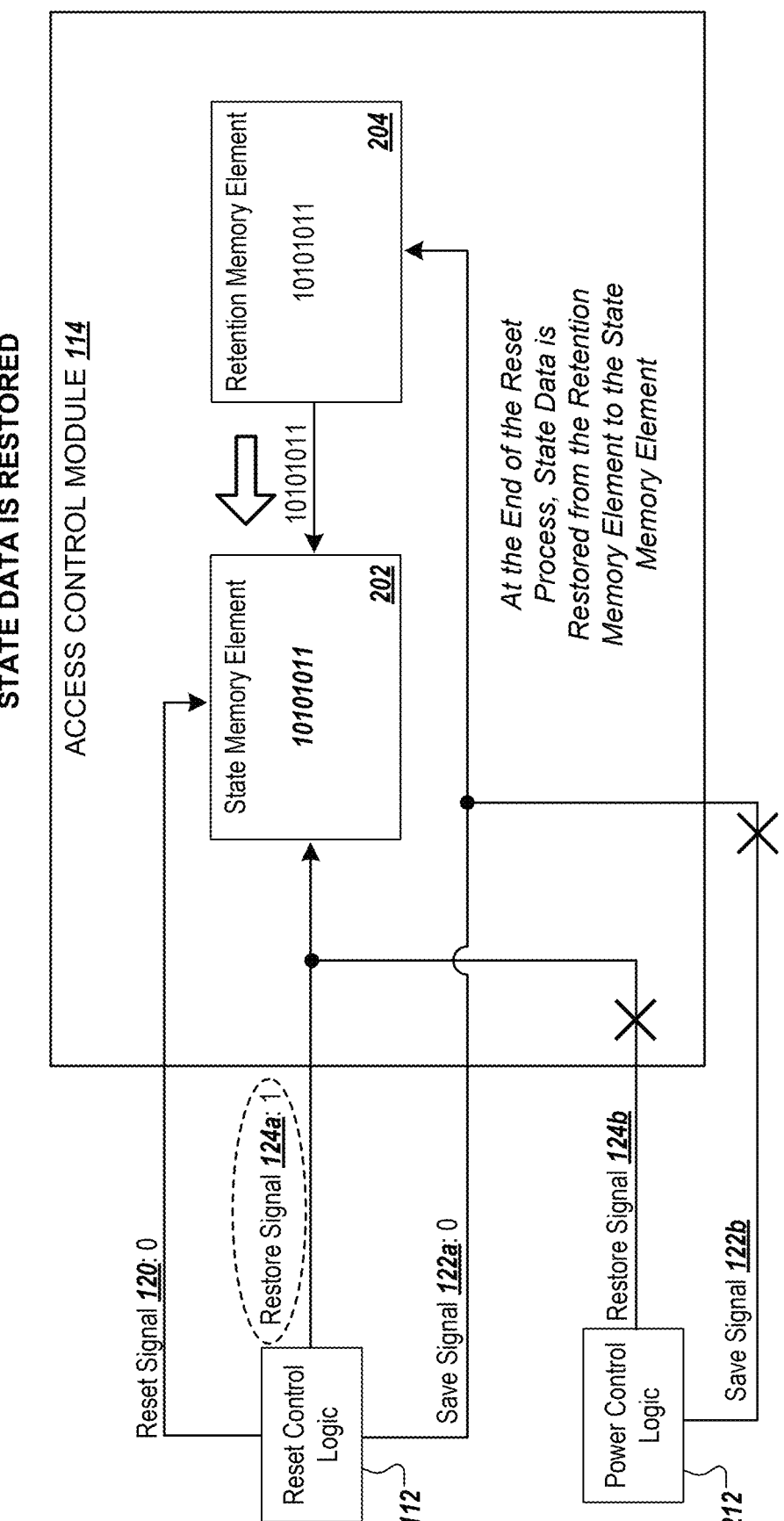

FIG. 3D shows a diagram of the example access control module 114 when the restore signal 124a is asserted. For example, after access control module 114 is reset and the reset signal 120 is deasserted by the reset control logic 112, the reset control logic 112 can assert the restore signal 124a. In response to the restore signal 124a being asserted, the state memory element 202 captures the state data preserved in the retention memory element 204 to restore the state of the access control module 114 before the reset signal 120 was asserted. For example, the state memory element 202 can be loaded with the binary value of "10101011."

As an example, the output of the restore signal 124a provided by the reset control logic 112 has changed from "0" under normal operation (e.g., as shown in FIG. 3A), when the save signal 122a has been asserted (e.g., as shown in FIG. 3B), and when the reset signal 120 has been asserted (e.g., as shown in FIG. 3C) to "1" to indicate that the restore signal 124a is being asserted by the reset control logic 112.

Although the example access control module 114 described above with respect to FIGS. 1, 2, and 3A-3D is shown having the one state memory element 202 and the one retention memory element 204, the access control module 114 is not limited to one state memory element and one retention memory element. For example, the access control module 114 can include multiple state memory elements and multiple corresponding retention memory elements.

Figure 4:
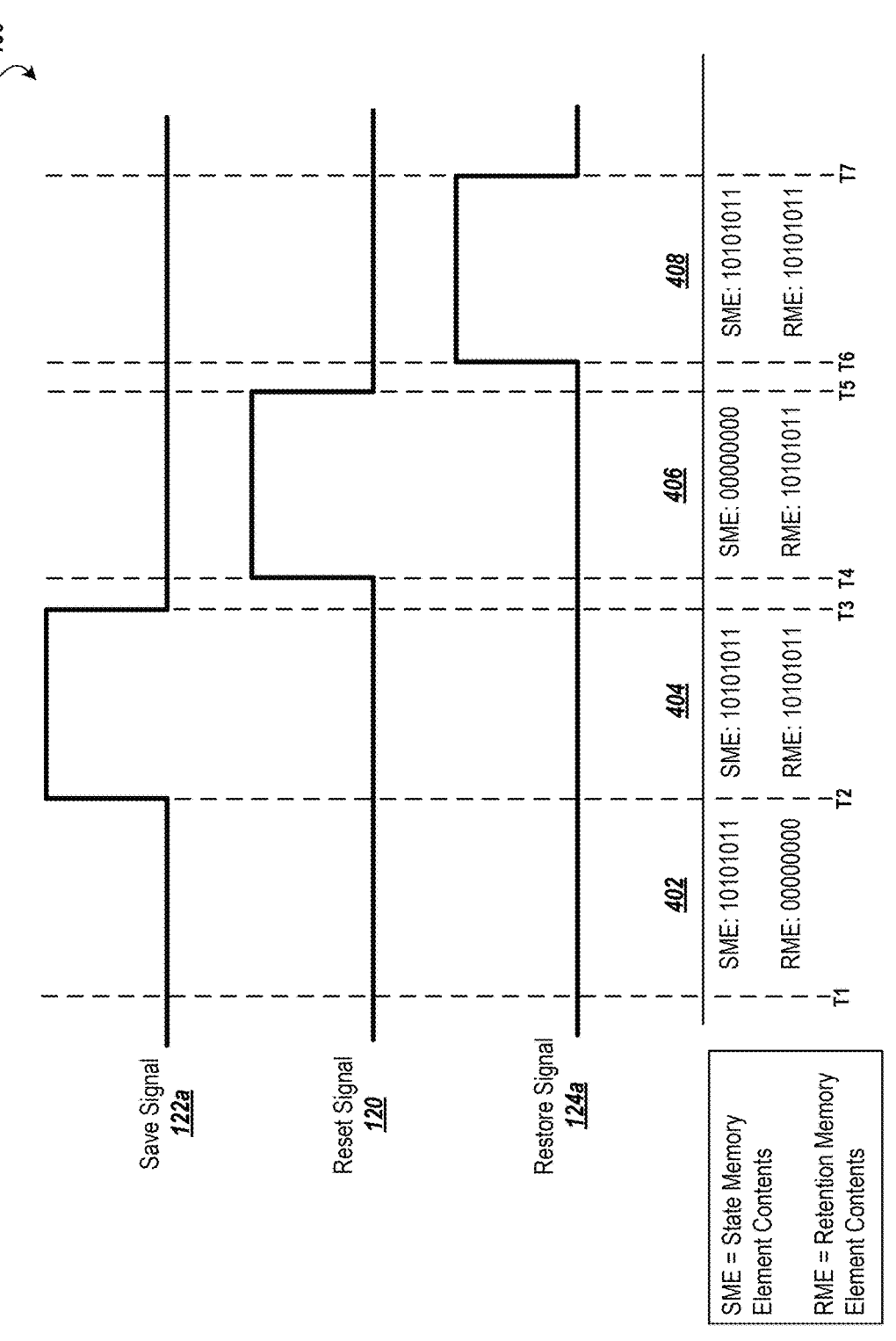
FIG. 4 is timing diagram of different signals used to perform reset.

FIG. 4 is timing diagram 400 of different signals used to perform a reset. For example, the timing diagram 400 includes the save signal 122a used to save state data of the access control module 114, a reset signal 120 used to reset the access control module 114 and one or more other modules of the SoC 110, and the restore signal 124a to restore state data of the access control module 114.

The timing diagram 400 includes a first time period 402 (e.g., from T1 to T2) that corresponds to normal operation of the SoC 110 as described above with respect to FIG. 3A, a second time period 404 (e.g., from T2 to T3) that corresponds to operation of the SoC 110 after the save signal 122a is asserted as described above with respect to FIG. 3B, a third time period 406 (e.g., from T4 to T5) that corresponds to operation of the SoC 110 after the reset signal 120 is asserted as described above with respect to FIG. 3C, and a fourth time period 408 (e.g., from T6 to T7) that corresponds to operation of the SoC 110 after the restore signal 124a is asserted as described above with respect to FIG. 3D.

The timing diagram 400 shows example state data stored in the state memory element 202 and the retention memory element 204 at each of the different time periods 402, 404, 406, and 408 (e.g., by the end of each of the time periods 402, 404, 406, and 408). For example, at the time T5 which corresponds to the end of the time period 406 and the deassertion of the reset signal 120, the state memory element 202 stores a binary value of "0000000" and the retention memory element stores a binary value of "10101011."

As shown in the timing diagram 400, certain signals can require other signals to be deasserted at the same time as or before the signals are asserted. For example, the reset signal 120 may require the save signal 122a to be deasserted before the reset signal 120 can be asserted or to be deasserted at the same time that the reset signal 120 is asserted. In more detail, the time between T3 and T4 can represent the time between the save signal 122a being deasserted and the time when the reset signal 120 is asserted. When the save signal 122a is deasserted at substantially the same time that the reset signal 120 is asserted, T3 can substantially equal T4.

As another example, the time difference between T3 and T4 can include one or more clock cycles or a portion of a clock cycle. In more detail, after the save signal 122a is deasserted, the reset signal 120 can be asserted on a next rising edge of the SoC 110's clock signal or after a threshold number of clock signals have elapsed since the save signal 122a was deasserted.

As another example, the restore signal 124a may require the reset signal 120 to be deasserted before the restore signal 124a can be asserted or to be deasserted at the same time that the restore signal 124a is asserted. In more detail, the time between T5 and T6 can represent the time between the reset signal 120 being deasserted and the time when the restore signal 124a is asserted. When the reset signal 120 is deasserted at substantially the same time that the restore signal 124a is asserted, T5 can substantially equal T6. As another example, the time difference between T5 and T6 can include one or more clock cycles or a portion of a clock cycle. In more detail, after the reset signal 120 is deasserted, the restore signal 124a can be asserted on a next rising edge of the SoC 110's clock signal or after a threshold number of clock signals have elapsed since the reset signal 120 was deasserted.

The examples above primarily described the preservation and restoration of state data of an access control module of a SoC through a shared reset of multiple modules of the SoC. However, the same techniques can also be used to preserve and restore state data of other components of the SoC through a reset, such as other modules that represent other sub-systems of the SoC or other domains of the SoC. For example, the same techniques described above can be applied to an application module that represents and application sub-system of the SoC or a networking module that represents a networking sub-system of the SoC.

In addition to the embodiments described above, the following embodiments are also innovative:

Embodiment 1 is an integrated circuit comprising: one or more modules that are configured to be reset in response to a reset signal; an access control module that is configured to be reset in response to the reset signal, wherein the access control module includes one or more first memory elements to store state data indicating a state of the access control module in the one or more first memory elements, wherein the access control module is configured such that state data in the one or more first memory elements is cleared in response to the reset signal; one or more second memory elements that is configured to retain stored data during reset of the access control module, the one or more second memory elements being configured to obtain data from the one or more first memory elements in response to a save signal and to provide data to the one or more first memory elements in response to a restore signal; and reset control logic configured to cause the integrated circuit to be reset while the state of the access control module is preserved, the reset control logic being configured to cause the reset by performing a sequence of operations that includes (i) issuing the save signal to cause the one or more second memory elements to obtain, from the one or more first memory elements, the state data that indicates the state of the access control module, (ii) issuing the reset signal to cause the one or more modules and the access control module to be reset, and (iii) issuing the restore signal to cause the state data for the access control module to be restored to the one or more first memory elements from the one or more second memory elements.

Embodiment 2 is the integrated circuit of any preceding embodiment, wherein the one or more second memory elements is included in the access control module.

Embodiment 3 is the integrated circuit of any preceding embodiment, wherein the state data for the access control module specifies a configuration of the access control module or values of settings for the control module, and wherein the access control module is configured to use contents stored in the one or more first memory elements to set operation of the access control module.

Embodiment 4 is the integrated circuit of any preceding embodiment, wherein the state data comprises one or more of an operating setting, an access permission value, an encryption key, a memory pointer, or a mask register value.

Embodiment 5 is the integrated circuit of any preceding embodiment, wherein the one or more modules comprise at least one of a microcontroller, a microprocessor, a graphics processing unit, a machine learning accelerator, a digital signal processor, a modem, a memory controller, or a disk controller.

Embodiment 6 is the integrated circuit of any preceding embodiment, wherein the integrated circuit is configured such that issuing the reset signal returns the access control module and the one or more modules to default operating modes for the respective modules.

Embodiment 7 is the integrated circuit of any preceding embodiment, wherein the one or more modules each have respective memory elements and state data: and wherein the integrated circuit is configured such that issuing the reset signal (i) causes the state data of the access control module in the one or more first memory elements to be cleared or set to a default value, and (ii) causes the state data in the memory element of the one or more modules to be cleared or set to default values.

Embodiment 8 is the integrated circuit of any preceding embodiment, wherein the reset control logic is configured to receive a reset command and to perform the sequence of operations in response to receiving the reset command.

Embodiment 9 is the integrated circuit of any preceding embodiment, wherein the one or more second memory elements is a set of retention flip flops that are configured to store state data of the access control module while the access control module is powered down.

Embodiment 10 is the integrated circuit of any preceding embodiment, wherein the access control module and the one or more first memory elements are powered in a first power domain of the integrated circuit, and wherein the one or more second memory elements is powered in a second power domain of the integrated circuit that is different from the first power domain that powers the one or more first memory elements and the rest of the access control module.

Embodiment 11 is the integrated circuit of any preceding embodiment, wherein the integrated circuit comprises power management logic configured to cause the state data from the one or more first memory elements to be stored into the one or more second memory elements, be retained while the access control module is powered down, and be restored to the one or more first memory elements after power is returned to the access control module.

Embodiment 12 is the integrated circuit of any preceding embodiment, wherein the integrated circuit comprises power management logic configured to cause the access control module to be powered down while the state of the access control module is preserved, by performing operations comprising: before powering down the access control module, issuing the save signal to cause the one or more second memory elements to obtain, from the one or more first memory elements, the state data that indicates the state of the access control module: and after powering up the access control module, issuing the restore signal to cause the state data for the access control module to be restored to the one or more first memory elements from the one or more second memory elements.

Embodiment 13 is the integrated circuit of any preceding embodiment, wherein each of the one or more first memory elements and the second memory includes volatile memory comprising one or more of a latch, a flip flop, or an SRAM.

Embodiment 14 is the integrated circuit of any preceding embodiment, wherein each of the one or more first memory elements and the one or more second memory elements comprises a register file or register bank.

Embodiment 15 is the integrated circuit of any preceding embodiment, comprising conductors configured to provide the reset signal concurrently to the one or more modules and the access control module such that the one or more modules and the access control module are reset concurrently in response to issuance of the reset signal.

Embodiment 16 is the integrated circuit of any preceding embodiment, wherein the access control module is configured to perform security services including granting or denying access to resources of the integrated circuit.

Embodiment 17 is the integrated circuit of any preceding embodiment, wherein the reset control logic comprises a state machine configured to issue the save signal, the reset signal, and the restore signal.

Embodiment 18 is the integrated circuit of any preceding embodiment, wherein the integrated circuit is a system on a chip.

Embodiment 19 is a method comprising: receiving a reset command at an integrated circuit, the integrated circuit comprising multiple modules including an access control module and one or more additional modules, wherein the access control module includes one or more first memory elements to store state data specifying a current state of the access control module, the one or more first memory elements configured to be cleared during reset of the access control module, and wherein the integrated circuit comprises one or more second memory elements configured to retain stored data during reset of the access control module: and in response to receiving the reset command, performing a reset of the multiple modules of the integrated circuit while preserving state data indicating a state of the access control module, including: obtaining the state data of the access control module from the one or more first memory elements and storing the state data in the one or more second memory elements of the access control module: after saving the state data in the one or more second memory elements, resetting the access control module and the one or more additional modules: and after resetting the access control module and the one or more modules, restoring the state of the access control module, including storing the state data from the one or more second memory elements in the one or more first memory elements.

Embodiment 20 is the method of embodiment 19, wherein resetting the access control module and the one or more additional modules comprises issuing a reset signal, provided to each of the multiple modules, that triggers each of the multiple modules to be concurrently reset.

Embodiment 21 is the method of embodiment 18 or 19, wherein resetting the access control module and the one or more additional modules comprises clearing or setting default values for memory elements of the multiple modules except for the one or more second memory elements.

Embodiment 22 is the method of any of embodiments 19 to 21, wherein the integrated circuit comprises reset control logic configured to perform the reset by performing a sequence of operations comprising (i) issuing a save signal to cause the one or more second memory elements to obtain, from the one or more first memory elements, the state data that indicates the state of the access control module, (ii) issuing a reset signal to cause the access control module and the one or more additional modules to be reset, and (iii) issuing a restore signal to cause the state data for the access control module to be restored to the one or more first memory elements from the one or more second memory elements.

Embodiment 23 is the method of embodiment 22, wherein the reset control logic is configured to receive a reset command and to perform the sequence of operations in response to receiving the reset command.

Embodiment 24 is the method of embodiment 22 or 23, wherein the reset control logic comprises a state machine configured to issue the save signal, the reset signal, and the restore signal.

Embodiment 25 is the method of any of embodiments 19 to 24, wherein the one or more second memory elements is included in the access control module.

Embodiment 26 is the method of any of embodiments 19 to 25, wherein the state data for the access control module specifies a configuration of the access control module or values of settings for the control module, and wherein the access control module is configured to use contents stored in the one or more first memory elements to set operation of the access control module.

Embodiment 27 is the method of any of embodiments 19 to 26, wherein the state data comprises one or more of an operating setting, an access permission value, an encryption key, a memory pointer, or a mask register value.

Embodiment 28 is the method of any of embodiments 19 to 27, wherein the one or more additional modules comprise at least one of a microcontroller, a microprocessor, a graphics processing unit, a machine learning accelerator, a digital signal processor, a modem, a memory controller, or a disk controller.

Embodiment 29 is the method of any of embodiments 19 to 28, wherein the integrated circuit is configured such that issuing the reset signal returns the access control module and the one or more additional modules to default operating modes for the respective modules.

Embodiment 30 is the method of any of embodiments 19 to 29, wherein the one or more additional modules each have respective memory elements and state data: and wherein the integrated circuit is configured such that issuing the reset signal (i) causes the state data of the access control module in the one or more first memory elements to be cleared or set to a default value, and (ii) causes the state data in the memory element of the one or more additional modules to be cleared or set to default values.

Embodiment 31 is the method of any of embodiments 19 to 30, wherein the one or more second memory elements is a set of retention flip flops that are configured to store state data of the access control module while the access control module is powered down.

Embodiment 32 is the method of any of embodiments 19 to 32, wherein the access control module and the one or more first memory elements are powered in a first power domain of the integrated circuit, and wherein the one or more second memory elements is powered in a second power domain of the integrated circuit that is different from the first power domain that powers the one or more first memory elements and the rest of the access control module.

Embodiment 33 is the method of any of embodiments 19 to 32, wherein the integrated circuit comprises power management logic configured to cause the state data from the one or more first memory elements to be stored into the one or more second memory elements, be retained while the access control module is powered down, and be restored to the one or more first memory elements after power is returned to the access control module.

Embodiment 34 is the method of any of embodiments 19 to 33, wherein the integrated circuit comprises power management logic configured to cause the access control module to be powered down while the state of the access control module is preserved, by performing operations comprising: before powering down the access control module, issuing a save signal to cause the one or more second memory elements to obtain, from the one or more first memory elements, the state data that indicates the state of the access control module: and after powering up the access control module, issuing a restore signal to cause the state data for the access control module to be restored to the one or more first memory elements from the one or more second memory elements.

Embodiment 35 is the method of any of embodiments 19 to 34, wherein each of the one or more first memory elements and the second memory includes volatile memory comprising one or more of a latch, a flip flop, or an SRAM.

Embodiment 36 is the method of any of embodiments 19 to 35, wherein each of the one or more first memory elements and the one or more second memory elements comprises a register file or register bank.

Embodiment 37 is the method of any of embodiments 19 to 36, wherein the integrated circuit comprises conductors configured to provide a reset signal concurrently to the one or more additional modules and the access control module such that the one or more modules and the access control module are reset concurrently in response to issuance of the reset signal.

Embodiment 38 is the method of any of embodiments 19 to 37, wherein the access control module is configured to perform security services including granting or denying access to resources of the integrated circuit.

Embodiment 39 is the method of any of embodiments 19 to 38, wherein the integrated circuit is configured to use the one or more second memory elements to retain state data of the access control module when the access control module is powered down in addition to during reset of the access control module.

Embodiment 40 is the electronic device comprising the integrated circuit of any of embodiments 1 to 18.

Embodiment 41 is the one or more non-transitory machine-readable media storing instructions that, when executed, cause a device to perform the method of any of embodiments 19 to 39.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages: and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data. e.g., one or more scripts stored in a markup language document, in a single file dedicated to the program in question, or in multiple coordinated files, e.g., files that store one or more modules, sub-programs, or portions of code.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client device having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what is being or may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. An integrated circuit comprising:
one or more modules that are configured to be reset in response to a reset command;
an access control module comprising one or more first memory elements configured to store state data indicating a state of the access control module, the access control module configured to be reset in response to the reset command, such that state data in the one or more first memory elements is cleared in response to a reset signal;
one or more second memory elements configured to:
retain stored data during reset sequence of the access control module;
obtain data from the one or more first memory elements in response to a save signal;

and provide data to the one or more first memory elements in response to a restore signal; and reset control logic configured to:

cause the integrated circuit to be reset while the state of the access control module is preserved; and cause the reset by performing a sequence of operations that includes (i) issuing the save signal to cause the one or more second memory elements to obtain, from the one or more first memory elements, the state data that indicates the state of the access control module, (ii) issuing the reset signal to cause the one or more modules and the access control module to be reset, and (iii) issuing the restore signal to cause the state data for the access control module to be restored to the one or more first memory elements from the one or more second memory elements.

2. The integrated circuit of claim 1, wherein:

the state data for the access control module specifies a configuration of the access control module or values of settings for the access control module; and the access control module is configured to use contents stored in the one or more first memory elements to set operation of the access control module.

3. The integrated circuit of claim 1, wherein the state data comprises one or more of an operating setting, an access permission value, an encryption key, a memory pointer, or a mask register value.

4. The integrated circuit of claim 1, wherein:

the one or more modules each have respective memory elements and state data; and the integrated circuit is configured such that issuing the reset signal causes:

the state data of the access control module in the one or more first memory elements to be cleared or set to a default value; and the state data in the memory element of the one or more modules to be cleared or set to default values.

5. The integrated circuit of claim 1, wherein:

the access control module and the one or more first memory elements are powered in a first power domain of the integrated circuit; and the one or more second memory elements is powered in a second power domain of the integrated circuit that is different from the first power domain that powers the one or more first memory elements and the rest of the access control module.

6. The integrated circuit of claim 1, further comprising a power management logic configured to cause the access control module to be powered down while the state of the access control module is preserved by performing operations comprising:

before powering down the access control module, issuing the save signal to cause the one or more second memory elements to obtain, from the one or more first memory elements, the state data that indicates the state of the access control module; and after powering up the access control module, issuing the restore signal to cause the state data for the access control module to be restored to the one or more first memory elements from the one or more second memory elements.

7. The integrated circuit of claim 1, wherein the reset control logic comprises a state machine configured to issue the save signal, the reset signal, and the restore signal.

8. A method comprising:

receiving a reset command at an integrated circuit, the integrated circuit comprising:

multiple modules comprising an access control module and one or more additional modules, the access control module comprising one or more first memory elements to store state data specifying a current state of the access control module, the one or more first memory elements configured to be cleared during a sequence of the access control module; and one or more second memory elements configured to retain stored data during reset of the access control module; and in response to receiving the reset command, performing the request sequence of the multiple modules of the integrated circuit while preserving state data indicating a state of the access control module, the reset sequence of the multiple modules of the integrated circuit comprising:

obtaining the state data of the access control module from the one or more first memory elements;

storing the state data in the one or more second memory elements of the access control module;

after saving the state data in the one or more second memory elements, resetting the access control module and the one or more additional modules; and after resetting the access control module and the one or more modules, restoring the state of the access control module, the restoring comprising storing the state data from the one or more second memory elements in the one or more first memory elements;

wherein the reset sequence of the multiple modules of the integrated circuit is performed by a reset control logic comprising a state machine configured to issue:

a save signal, the obtaining the state data of the access control module from the one or more first memory elements responsive to the save signal;

a reset signal, wherein the one or more first memory elements is cleared in response to the reset signal; and a restore signal, the storing of the state data in the one or more first memory elements of the access control module responsive to the restore signal.

9. The method of claim 8, wherein:

the state data for the access control module specifies a configuration of the access control module or values of settings for the access control module; and the access control module is configured to use contents stored in the one or more first memory elements to set operation of the access control module.

10. The method of claim 8, wherein the state data comprises one or more of an operating setting, an access permission value, an encryption key, a memory pointer, or a mask register value.

11. The method of claim 8, wherein:

the one or more additional modules each have respective memory elements and state data; and the integrated circuit is configured such that issuing the reset command causes:

the state data of the access control module in the one or more first memory elements to be cleared or set to a default value; and the state data in the memory element of the one or more additional modules to be cleared or set to default values.

12. The method of claim 8, wherein:

the access control module and the one or more first memory elements are powered in a first power domain of the integrated circuit; and the one or more second memory elements is powered in a second power domain of the integrated circuit that is different from the first power domain that powers the one or more first memory elements and the rest of the access control module.

13. The method of claim 8, wherein the integrated circuit comprises power management logic configured to cause the access control module to be powered down while the state of the access control module is preserved by performing operations comprising:

before powering down the access control module, issuing the save signal to cause the one or more second memory elements to obtain, from the one or more first memory elements, the state data that indicates the state of the access control module; and after powering up the access control module, issuing the restore signal to cause the state data for the access control module to be restored to the one or more first memory elements from the one or more second memory elements.

14. One or more non-transitory machine-readable media storing instructions that, when executed, cause a device to:

receive a reset command at an integrated circuit, the integrated circuit comprising:

multiple modules comprising an access control module and one or more additional modules, the access control module comprising one or more first memory elements to store state data specifying a current state of the access control module, the one or more first memory elements configured to be cleared during a reset sequence of the access control module; and one or more second memory elements configured to retain stored data during the reset sequence of the access control module; and in response to receipt of the reset command, perform the request sequence of the multiple modules of the integrated circuit while preserving state data indicating a state of the access control module; the reset sequence of the multiple modules of the integrated circuit comprising:

obtaining the state data of the access control module from the one or more first memory elements;

storing the state data in the one or more second memory elements of the access control module;

after saving the state data in the one or more second memory elements, resetting the access control module and the one or more additional modules; and after resetting the access control module and the one or more modules, restoring the state of the access control module, the restoring comprising storing the state data from the one or more second memory elements in the one or more first memory elements;

wherein the reset sequence of the multiple modules of the integrated circuit is performed by a reset control logic comprising a state machine configured to issue:

a save signal, the obtaining the state data of the access control module from the one or more first memory elements responsive to the save signal;

a reset signal, wherein the one or more first memory elements is cleared in response to the reset signal; and a restore signal, the storing of the state data in the one or more first memory elements of the access control module responsive to the restore signal.

15. The non-transitory machine-readable media of claim 14, wherein:

the state data for the access control module specifies a configuration of the access control module or values of settings for the access control module; and the access control module is configured to use contents stored in the one or more first memory elements to set operation of the access control module.

16. The non-transitory machine-readable media of claim 14, wherein the state data comprises one or more of an operating setting, an access permission value, an encryption key, a memory pointer, or a mask register value.

17. The non-transitory machine-readable media of claim 14, wherein:

the one or more additional modules each have respective memory elements and state data; and the integrated circuit is configured such that issuing the reset signal causes: the state data of the access control module in the one or more first memory elements to be cleared or set to a default value; and the state data in the memory element of the one or more additional modules to be cleared or set to default values.

18. The non-transitory machine-readable media of claim 14, wherein:

the access control module and the one or more first memory elements are powered in a first power domain of the integrated circuit; and the one or more second memory elements is powered in a second power domain of the integrated circuit that is different from the first power domain that powers the one or more first memory elements and the rest of the access control module.

19. The non-transitory machine-readable media of claim 14, wherein the integrated circuit comprises power management logic configured to cause the access control module to be powered down while the state of the access control module is preserved by performing operations comprising:

before powering down the access control module, issuing the save signal to cause the one or more second memory elements to obtain, from the one or more first memory elements, the state data that indicates the state of the access control module; and after powering up the access control module, issuing the restore signal to cause the state data for the access control module to be restored to the one or more first memory elements from the one or more second memory elements.

* * * * *